(12) United States Patent
Kulprathipanja et al.

(10) Patent No.: US 11,680,672 B2
(45) Date of Patent: *Jun. 20, 2023

(54) INSULATION BLANKET HAVING A DEPOSITED PASSIVATOR FOR INDUSTRIAL INSULATION APPLICATIONS

(71) Applicant: JOHNS MANVILLE, Denver, CO (US)

(72) Inventors: Ames Kulprathipanja, Broomfield, CO (US); Marybeth Jones, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,261

(22) Filed: Sep. 27, 2021

(65) Prior Publication Data

US 2022/0042640 A1   Feb. 10, 2022

Related U.S. Application Data (63) Continuation of application No. 16/405,461, filed on May 7, 2019, now Pat. No. 11,187,367.

(51) Int. Cl.
*F16L 9/14* (2006.01)
*F16L 59/02* (2006.01)
(Continued)

(52) U.S. Cl.
CPC .......... *F16L 59/026* (2013.01); *D04H 1/4218* (2013.01); *B32B 5/022* (2013.01);
(Continued)

(58) Field of Classification Search
CPC ............... F16L 59/026; D04H 1/4218; B32B 2307/304
(Continued)

(56) References Cited

U.S. PATENT DOCUMENTS

| | | |
|---|---|---|
| 1,618,455 A | 2/1927 | Lindsay |
| 1,661,254 A | 3/1928 | Gillies |

(Continued)

FOREIGN PATENT DOCUMENTS

| | | |
|---|---|---|
| EP | 3 067 201 A1 | 12/2007 |
| EP | 3 354 620 A1 | 8/2018 |

OTHER PUBLICATIONS

Aspen Aerogels Inc., 30 Forbes Bld. B, Northborough, MA 01532: Pyrogel XTE—Flexible Insulation for High Temperature Applications, Dec. 23, 2018 (Dec. 23, 2018), XP002800040, Retrieved from the Internet: URL:https://www.aerogel.com/productd-and-solutions/pyrogel-xte.

(Continued)

*Primary Examiner* — James F Hook
(74) *Attorney, Agent, or Firm* — Robert D. Touslee (57) ABSTRACT

A passivating flexible insulation blanket positionable about a pipe includes an insulation core, an enclosing fabric, and a non-consumable passivator. The insulation core is substantially hydrophobic and includes a microporous material. The enclosing fabric fully encapsulates the insulation core to form a capsule or pouch about the insulation core. The non-consumable passivator is non-consumable such that there is no appreciable change to a mass of the non-consumable passivator after an extended time of activation. The non-consumable passivator is deposited into the insulation core and has a composition soluble in water. The non-consumable passivator includes a leachable component that leaches from the insulation core and is capable of neutralizing acidic components. The leachable component is water soluble and is capable of reacting with a surface of the pipe to form a protective coating on the pipe to aid in inhibiting corrosion formation on the surface of the pipe.

20 Claims, 7 Drawing Sheets

(51) Int. Cl.
*D04H 1/4218* (2012.01)
*B32B 5/02* (2006.01)
*B32B 5/12* (2006.01)

(52) U.S. Cl.
CPC ............... *B32B 5/024* (2013.01); *B32B 5/12* (2013.01); *B32B 2307/304* (2013.01)

(58) Field of Classification Search
USPC ................................................ 138/146, 149
See application file for complete search history.

(56) References Cited

U.S. PATENT DOCUMENTS

| | | | | |
|---|---|---|---|---|
| 3,206,867 | A | * | 9/1965 | Ziegler .................. F16L 59/14 |
| | | | | 34/104 |
| 3,346,016 | A | | 10/1967 | Blau et al. |
| 3,418,399 | A | * | 12/1968 | Ziegler .................. B29C 33/52 |
| | | | | 156/196 |
| 3,665,968 | A | | 5/1972 | De Putter |
| 3,769,072 | A | * | 10/1973 | Echerd ................. F16L 59/145 |
| | | | | 428/920 |
| 4,009,735 | A | | 3/1977 | Pinsky |
| 4,095,937 | A | * | 6/1978 | Colburn ................... F27D 3/02 |
| | | | | 138/144 |
| 4,680,070 | A | | 7/1987 | Hughes |
| 4,692,363 | A | | 9/1987 | Reiss et al. |
| 6,273,144 | B1 | | 8/2001 | Bohon et al. |
| 6,505,650 | B2 | * | 1/2003 | Bohon .................... F16L 59/14 |
| | | | | 138/146 |
| 8,784,962 | B2 | * | 7/2014 | Weidinger ............... B32B 5/02 |
| | | | | 138/143 |
| 11,187,367 | B2 | | 11/2021 | Kulprathipanja et al. |
| 2002/0083993 | A1 | | 7/2002 | Bohon et al. |
| 2005/0031894 | A1 | | 2/2005 | Klos et al. |
| 2006/0272727 | A1 | | 12/2006 | Dinon et al. |
| 2007/0289974 | A1 | | 12/2007 | Blair et al. |
| 2008/0307737 | A1 | | 12/2008 | Pirogovsky et al. |
| 2010/0095520 | A1 | | 4/2010 | Damour et al. |
| 2017/0022703 | A1 | | 1/2017 | Buttner et al. |

OTHER PUBLICATIONS

Aspen Aerogels, Inc., Sep. 18, 2017 (Sep. 18, 2017), XP002800041, Retrieved from the Internet: URL:https://web.archive.org/web/20170918130846/http://www.aerogel.com/_resources/common/userfiles/file/SDS-AIS/Pyrogel_XT-E_AIS_EU.pdf.

* cited by examiner

INSULATION BLANKET HAVING A DEPOSITED PASSIVATOR FOR INDUSTRIAL INSULATION APPLICATIONS

CROSS-REFERENCE TO RELATED APPLICATION

This application is a continuation of pending U.S. application Ser. No. 16/405,461 filed May 7, 2019. The entire contents of the above-identified application are herein incorporated by reference for all purposes.

BACKGROUND OF THE INVENTION

The subject invention relates generally to insulation blankets and preventing corrosion formation. In particular, the present invention relates to depositing a passivator in an insulation material to form a corrosion inhibiting insulation blanket.

Insulation blankets are used to insulate objects such as pipes, storage tanks, and other facility equipment. Beyond insulating, insulation blankets often play a role in minimizing equipment degradation, metal errosion, and corrosion propagation. As most equipment and piping at facilities, such as petrochemical facilities, are metal or have some metal components, insulation blankets can provide a barrier between the equipment and corrosive environmental factors.

A corrosive environmental factor that facilities encounter is water. Water in both aqueous and vapor form often contains acidic components that tend to be reactive with metal surfaces. In particular, water containing acid components tends to be reactive with iron containing metal surfaces. The corrosive effect of water on metal surfaces lends moisture intrusion to be a concern for many industries. Exemplary industries may include petrochemical and refinery facilities, power plants, manufacturing facilities, and offshore oil production.

Corrosion under insulation (CUI) is a common type of localized corrosion that facilities face. CUI often results from water penetrating insulation and collecting between a surface and the insulation. For metal surfaces containing carbon, such as carbon steels, CUI may result in typical corrosion or localized corrosion. An example of typical corrosion may be the formation of hematite on a metal surface and an example of localized corrosion may be corrosion forming only at the location that the absorbed water contacts the metal surface. For stainless steel surfaces, such as AISI 300 series stainless steels, CUI may result in stress corrosion cracking and/or pitting of the metal surface. High temperatures are known to increase the detrimental effects of CUI.

A common type of surface that is affected by CUI is the surface of piping. Often piping is exposed to water due to its application. Piping is often used to transport one or more fluids between destinations, exposing the piping to ambient conditions and weather. For example, piping may be used to transport water, petroleum, oxygen, etc. The piping is often made from a metal material, such as copper, stainless steel, galvanized steel, aluminum, brass, titanium, etc., or from a plastic material, such as polyvinyl chloride (PVC), chlorinated polyvinyl chloride (CPVC), fiber reinforced plastic (FRP), polypropylene (PP), polyethylene (PE), etc. Piping may also be made from a ceramic, fiberglass, or concrete material, although these pipes are less common.

Even for piping systems housed inside a building, moisture intrusion is still problematic. Piping interruptions are a source of moisture intrusion risk for a piping system. Since all piping systems have some form of piping interruptions, piping inevitably is at risk for corrosion under insulation. A piping interruption is any break or component that breaks an otherwise straight run of piping. Common piping interruptions include piping elbows or tees, valves, flanges, piping termination points, piping supports, and inline instruments. Even if the piping run is straight without interruption, if the piping run is 18 or more feet long, a contraction joint is typically required. A contraction joint is also a type of piping interruption. This means, that for almost all piping systems, a piping interruption occurs every 18 feet or less on a pipe.

While many preventative measures are typically taken for limiting moisture intrusion, such as applying moisture repellant or using vapor barrier stops, water intrusion is likely to still occur. Any intrusion of water may risk lateral movement of water down the surface. For example, if water penetrates the insulation at a piping break, the water once under the insulation may laterally move down the pipe to surface areas where moisture intrusion has not occurred. In this way, any moisture intrusion may result in corrosion over a wide surface area, even surface area nowhere near the penetration location. Thus, even with preventative measures in place, equipment at facilities, in particular high temperature application facilities, are at risk for corrosion propagation and equipment degradation.

BRIEF DESCRIPTION OF THE INVENTION

Described herein is a passivating flexible insulation blanket positionable about a pipe. The passivating flexible insulation blanket described herein provides superior corrosion inhibition, reduces installation time and cost, allows for easy customization to a variety of insulation and corrosion needs, and minimizes labor requirements during installation. The passivating flexible insulation blanket of the present invention may include a insulation core that is substantially hydrophobic. The passivating flexible insulation blanket may also include a enclosing fabric that fully encapsulates the insulation core to form a capsule or pouch about the insulation core to form a barrier between the insulation core and an surface environment exterior to the enclosing fabric. In embodiments, the insulation core may be encapsulated between two enclosing fabrics stitched together to fully encapsulate the insulation core. For example, the enclosing fabric may be a glass fiber blanket. In various embodiments, the insulation core may be configured for high temperature applications. For example, the insulation core may be configured for applications having temperature ranges from 150° F. to 1,200° F.

The passivating flexible insulation blanket of the present invention may also include a non-consumable passivator having a composition soluble in water deposited in the insulation core. The non-consumable passivator may be non-consumable such that there is no appreciable change to a mass of the non-consumable passivator after an extended time of activation. In various embodiments, the non-consumable passivator may include at least one high solubility silicate and a carrier. The carrier may comprise low solubility silicate ions and metal oxides.

The non-consumable passivator may include a leachable component that leaches from the insulation core to the surface environment exterior to the enclosing fabric. The leachable component may be inorganic and may be capable of neutralizing acidic components when the leachable component and the acidic components come in contact with each other. For example, the leachable component may include one or more alkaline components. The leachable component may be water soluble and may be capable of reacting with a surface of the pipe to form a protective coating on the pipe that aids in inhibiting corrosion formation on the surface of the pipe. For example, the leachable component may include high solubility silicate ions. In various embodiments, the leachable component may act as a pH buffer when exposed to the surface environment exterior to the enclosing fabric. In other embodiments, the leachable component may promote magnetite formation on the surface of the pipe when exposed to the surface environment exterior to the enclosing fabric.

In various embodiments, the passivating flexible insulation blanket may include one or more additional components. For example, the passivating flexible insulation blanket may include fibers to add integral strength, or the passivating flexible insulation blanket may include an opacifier to slow radiant heat.

A method for manufacturing a passivating insulation blanket positionable about a pipe is also described herein. The method may include providing an insulation material. The insulation material may be substantially hydrophobic. The method also includes depositing a non-consumable passivator into the insulation material. In various embodiments, the amount of non-consumable passivator deposited into the insulation material may be 10 percent by weight. The non-consumable passivator may be non-consumable such that there is no appreciable change to a mass of the non-consumable passivator after an extended time of activation. The non-consumable passivator may include high solubility silicate ions and a carrier. The non-consumable passivator may include a leachable component that is capable of leaching from the insulation material when active. The leachable component may include an inorganic material capable of neutralizing acidic components when the leachable component and the acidic components come in contact with each other. For example, the leachable component may include one or more alkaline components. The leachable component may also be water soluble and capable of reacting with a surface of the pipe to form a protective coating on the pipe that aids in inhibiting corrosion formation on the surface of the pipe.

The method may also include forming the insulation material having the non-consumable passivator deposited into the insulation material into the passivating insulation blanket. Optionally, forming the insulation material may include solidifying the insulation material having the non-consumable passivator deposited into the insulation material to form the passivating insulation blanket. In some embodiments, the insulation material may include an insulation core that is fully encapsulated by an enclosing fabric to form a capsule or pouch about the insulation core to form a barrier between the insulation core and an environment. In other embodiments, the passivating insulation blanket may include a preformed insulation segment. Optionally, the preformed insulation segment may include mineral wool.

Also described herein is a passivating insulation blanket positionable about an object. For example, the passivating insulation blanket may be positionable about a pipe or a vessel. The passivating insulation blanket may include an insulation segment comprised of an insulation material. Optionally, the insulation segment may include an insulation core fully encapsulated by an enclosing fabric and the insulation segment may be flexible such to be positionable about a pipe. The insulation material may be hydrophobic such to resist moisture intrusion into the insulation segment. In various embodiments, the insulation material may include entangled fibers set in a preformed arrangement. Optionally, in embodiments where the insulation material includes entangled fibers set in a preformed arrangement, the insulation material may include mineral wool.

The passivating insulation blanket according to the present invention may also include a passivator deposited within the insulation segment. In various embodiments, the passivator may be non-consumable such that there is no appreciable change to the mass of the passivator after an extended time of activation. The passivator may include a leachable component that leaches from the insulation segment to an surface environment exterior to the insulation segment. The leachable component may be capable of neutralizing acidic components when the leachable component and the acidic components come into contact with each other. For example, the leachable component may include one or more alkaline components. The leachable component may also be water soluble. For example, the leachable component may include high solubility silicate ions. The leachable component may also be capable of forming a protective coating about a metal surface of the object that aids in inhibiting corrosion formation on the metal surface. In various embodiments, the leachable component may act as a pH buffer capable of inducing a pH of about or above 7 when leached into the surface environment exterior to the insulation segment. Optionally, the leachable component may be inorganic.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The present invention relates to a passivating insulation blanket that is used with a deposited passivator to inhibit corrosion formation on a metal surface. Insulation blankets used to insulate objects, such as pipes or storage tanks, have to withstand a variety of environmental challenges. These include moisture intrusion, metal degradation, corrosion, hematite formation, UV and visible light exposure, and weather degradation. Corrosion formation may include formation of hematite on the metal surface or metal degradation due to acidic conditions.

While preventative measures are generally taken to minimize moisture intrusion, water still penetrates into and through insulation. Water that intrudes and is absorbed by the insulation often collects between the insulation and the surface. This can lead to corrosion under insulation (CUI). CUI is a severe form of corrosion that results in degradation of metal surfaces and equipment. In part, water that penetrates insulation is detrimental to any underlying surfaces because of acidic components that are often dissolved in the water. The acidic components may degrade the surface and may promote corrosion formation by maintaining an acidic environment.

The passivating insulation blanket of the present invention exhibits enhanced corrosion resistance, pH buffering, and moisture intrusion resistance during the life of the insulation blanket. The term passivating, passivation, passivator, and the like as used herein means a material or component that is designed to inhibit corrosion by buffering a pH level in the vicinity of an insulated object, such as by neutralizing acidic compounds, and promoting magnetite formation on metal surfaces within the vicinity of the insulated object. Additionally, the term passivating, passivation, passivator and the like used herein means a material or component that is designed to form a protective coating on a metal surface or surface within the vicinity of an insulated object to aid in inhibiting corrosion. Exemplary corrosion inhibiting materials include high solubility silicate compounds and carriers, such as low solubility silicate compounds and metal oxides.

Figure 1:
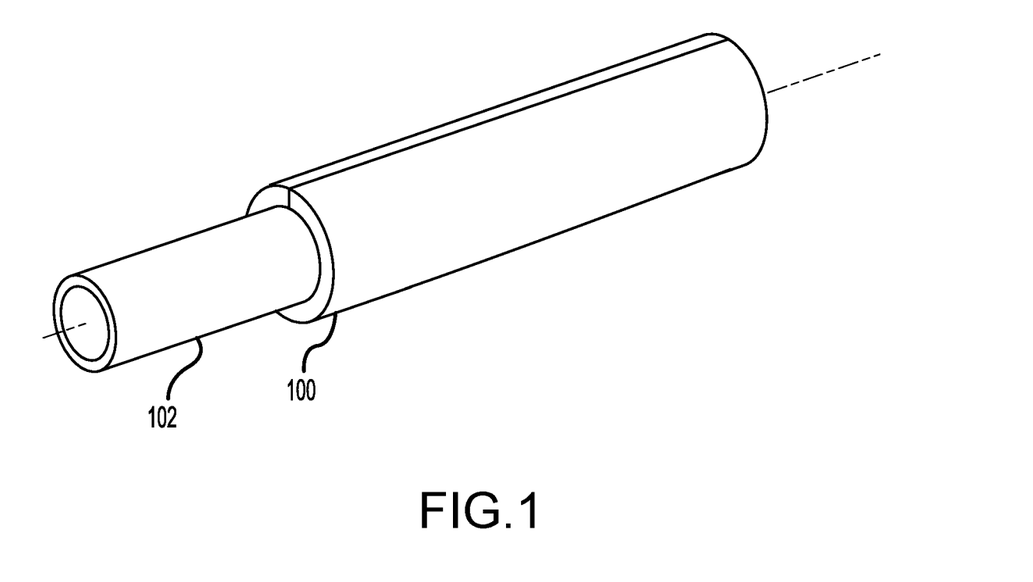
FIG. 1 is a schematic perspective view of a passivating insulation blanket that is flexible and positionable about a pipe.

As shown in FIG. 1, a passivating insulation blanket 100 may be positionable about a pipe 102. The passivating insulation blanket 100 may be flexible and conform to the outer surface of the pipe 102. In various embodiments, the passivating insulation blanket 100 may include a preformed insulation segment. The preformed insulation segment may be molded to the shape of an outer surface of a pipe, such as the pipe 102. The passivating insulation blanket 100 may directly contact the outer surface of pipe 102. In various embodiments, the passivating insulation blanket 100 may contact a binder or other coating applied to the surface of the pipe 102 in between the surface and the passivating insulation blanket 100.

In various embodiments, the pipe 102 may be made from a metal material, such as copper, stainless steel, galvanized steel, aluminum, brass, titanium, carbon steel, etc. In other embodiments, the pipe 102 may be made from a plastic material, such as polyvinyl chloride (PVC), chlorinated polyvinyl chloride (CPVC), fiber reinforced plastic (FRP), polypropylene (PP), polyethylene (PE), act. The pipe 102 may also be made from a ceramic, fiberglass, or concrete material.

Figure 2:
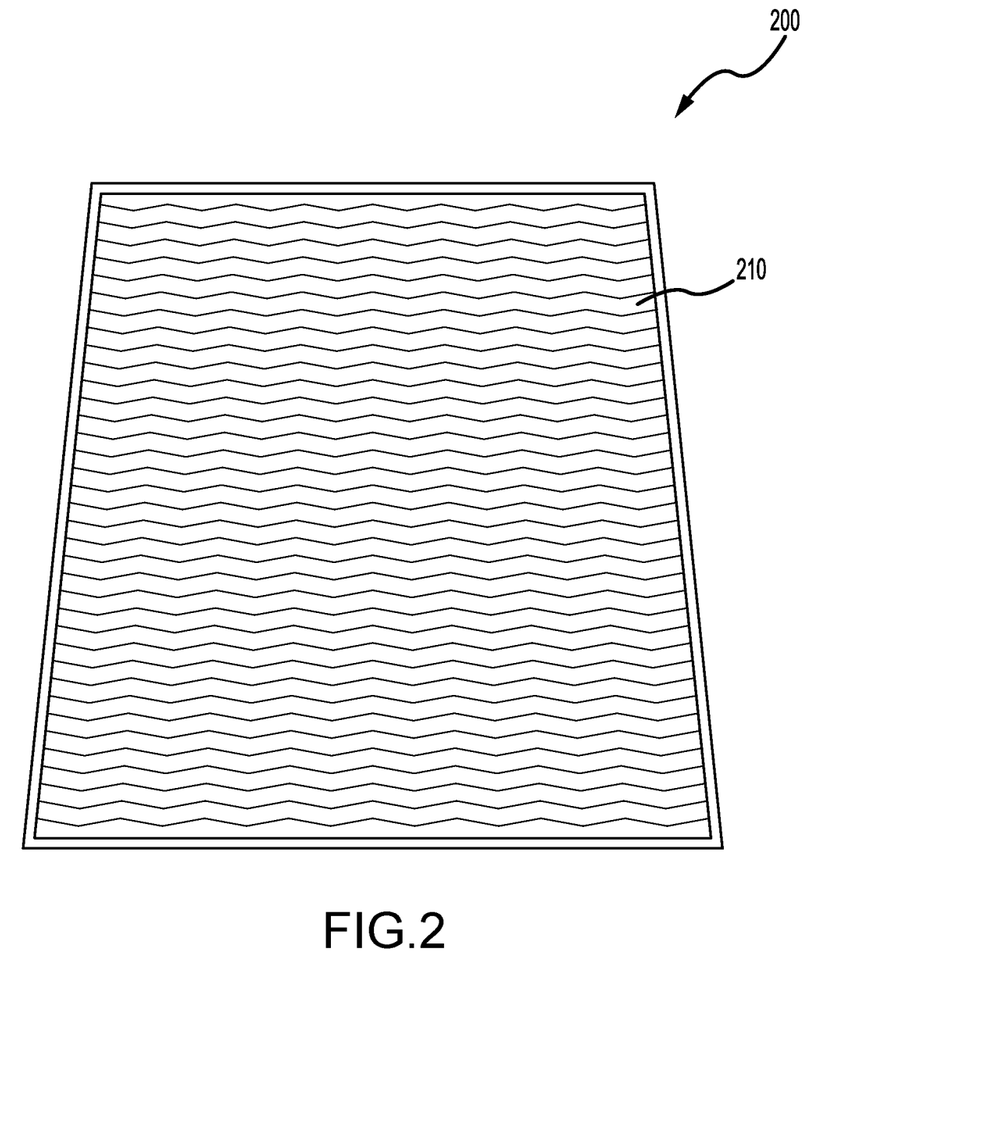
FIG. 2 is a schematic perspective view of a passivating insulation blanket according to one embodiment of the present invention with an enclosing fabric encapsulating an insulation core.

FIG. 2 provides a schematic illustration of a passivating insulation blanket 200 that may be flexible and positionable about an object, such as a pipe or a piece of equipment or vessel. For example, the object may be a tank, a storage vessel, a pressure vessel, a silo, a process control instrument (e.g., thermocouple, level gauge, act), a compressor, or a control panel. As noted above, the surface of the object that the passivating insulation blanket 200 may be positioned about may be metal. However, in other embodiments, the surface may be a non-metal material, such as plastic, ceramic, fiberglass, or concrete. For ease in describing the embodiments, the insulated object will be referred to hereinafter as a metal surface or object, although such disclosure is not meant to limit the application of the insulation blanket. The passivating insulation blanket 200 may be the same as the passivating insulation blanket 100.

The passivating insulation blanket 200 may be flexible such that the passivating insulation blanket 200 may be conformable to a metal surface. The flexibility of the passivating insulation blanket 200 may allow the passivating insulation blanket 200 to bend easily without any impediment or impact to the passivating insulation blanket 200's structure or properties (e.g., insulating, corrosion inhibiting). The passivating insulation blanket 200 may have a low-profile allowing for application in constrained spaces. The flexibility of the passivating insulation blanket 200 may allow the passivating insulation blanket 200 to be highly adaptable to unique shapes and/or configurations encountered within an application (e.g., industrial piping structure). Examples of configurations for which the passivating insulation blanket 200 may be applied include pipes (e.g., pipe 102), piping breaks, process control instruments, pressure vessels, compressors, scrubbers, distillation columns, control panels (e.g., PLC panels), or any other structure having a surface requiring insulation.

The passivating insulation blanket 200 may include an enclosing fabric 210. In embodiments, the enclosing fabric 210 may be a woven textile product consisting mainly of fibrous glass. In other embodiments, the enclosing fabric 210 may be made from glass fibers, ceramic fibers, carbon fibers, organic polymer fibers, or polyurethane foam. For example, the enclosing fabric 210 may be a glass fiber blanket or a plurality of glass fiber blankets. The enclosing fabric 210 may be configured for high temperature applications. High temperature applications may include applications having temperatures of at least 250° F., temperatures of at least 500° F., temperatures of at least 1000° F., temperatures of at least 1500° F., or temperatures of at least 2000° F. Examples of high temperature applications include refining and petrochemical processing, metallurgical casting processes, power plants, and offshore oil production. In other embodiments the enclosing fabric 210 may be configured for low temperature applications. For example, the enclosing fabric 210 may be configured for cryogenic applications. Low temperature applications may include applications having temperatures of 50° F. and below, temperatures of 0° F. and below, temperatures of −50° F. and below, temperatures of −100° F. and below, or temperatures of −200° F. and below. In still other embodiments, the enclosing fabric 210 may be configured for ambient conditions. An enclosing fabric configured for ambient conditions may be ineffective or nonfunctional in high temperature applications, such as those discussed above. Optionally, the enclosing fabric 210 may include a fire repellant.

In various embodiments, the enclosing fabric 210 may be hydrophobic. Hydrophobic is herein understood to mean a substance's lack of affinity for water and tendency to repel or not absorb water. The enclosing fabric 210 may be inherently hydrophobic due to the properties of the enclosing fabric 210 material. That is, the hydrophobic property of the enclosing fabric 210 may be due to the enclosing fabric 210 itself having hydrophobic properties. In various embodiments, however, the enclosing fabric 210 may not be inherently hydrophobic. Instead, the enclosing fabric 210 may become hydrophobic due to dust or particulate matter build-up on the enclosing fabric 210 from an enclosed material that is hydrophobic. The residue of dust or particulate matter from the enclosed material may provide the enclosing fabric 210 with hydrophobic or substantially hydrophobic properties. The term hydrophobic as used herein encompasses materials that are completely hydrophobic such that no moisture intrusion occurs, as well as materials that are substantially hydrophobic such that under normal conditions, a negligible amount of moisture intrusion may occur. The term hydrophobic may be interchangeable and coextensive with the term moisture repellant.

As illustrated in FIG. 2, the enclosing fabric 210 may have a patterned stitch. The patterned stitch may extend among the entirety of the surface area of the enclosing fabric 210 or the patterned stich may extend among only a portion of the surface area of the enclosing fabric 210. For example, the patterned stitch may extend around the periphery or edges of the enclosing fabric 210 such that the stitching may be present along the edges of the enclosing fabric 210. The patterned stiches may provide the enclosing fabric 210 with improved characteristics, such as moisture repellency, insulation, and durability due in part to the increased surface area created by the stitching. Examples of patterned stiches include rib, zigzag, running, and chain. In other embodiments, the enclosing fabric 210 does not have a patterned stitch.

Figure 3:
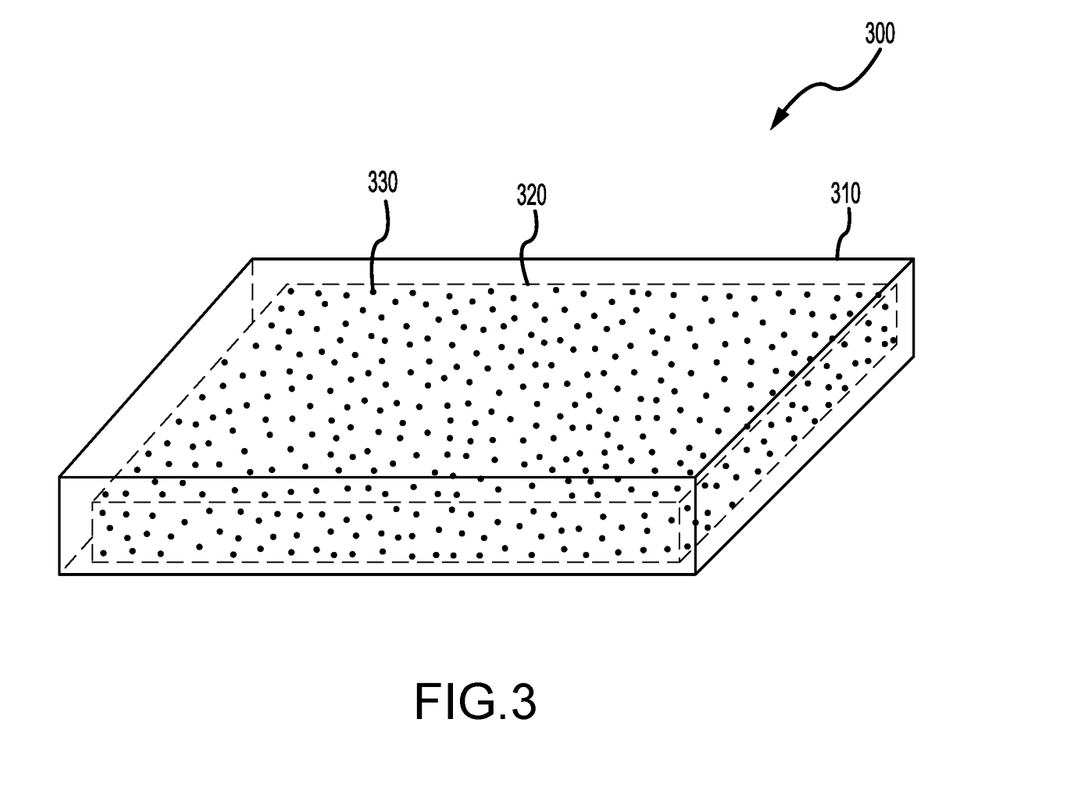
FIG. 3 is a schematic perspective view of a passivating insulation blanket according to another embodiment of the present invention with portions of the enclosing fabric made transparent to show the insulation core with a deposited passivator encapsulated within the enclosing fabric.

FIG. 3 provides a schematic illustration of the passivating insulation blanket 300 with a portion of the enclosing fabric 310 made transparent to show an insulation core 320 with a deposited passivator 330. The passivating insulation blanket 300 may be the same as the passivating insulation blanket 200 or the passivating insulation blanket 100. The enclosing fabric 310 may be the same as the enclosing fabric 210. Any discussion with reference to the passivating insulation blanket 200, specifically the enclosing fabric 210 is hereby incorporated.

The passivating insulation blanket 300 may be relatively rectangular in shape, having a length L, a width W, and a thickness T, which may be selected based on the application in which the passivating insulation blanket is used. In various embodiments, such as those discussed with refers to FIG. 4, the passivating insulation blanket 300 may be formed or molded into various configurations, such as to conform to a pipe. In such embodiments, the passivating insulation blanket 300 may also have a length L, a width W, and a thickness T. Common values for the length L include between 1 and 60 inches, although between 5 and 50 inches is more common, and between 10 and 25 inches is most common. Common values for the width W include between 1 and 60 inches, although between 5 and 50 inches is more common, and between 10 and 36 inches is most common. Common values for the thickness T include between 0.1 and 1.0 inches, although a thickness of between 0.2 and 0.8 inches is more commonly, and a thickness of between 0.3 and 0.6 inches is most common. In an exemplary embodiment, the passivating insulation blanket 300 may have a length L of 25 inches, a width W of 36 inches, and a thickness of approximately 0.39 inches (10 mm). In other examples, the passivating insulation blanket 300 may have a length L of 50 inches, a width W of 60 inches, and a thickness of approximately 0.2 inches (5 mm). In embodiments, the passivating insulation blanket 300 may be sized to the dimensions of a pipe or object of which it is to insulation. Accordingly, the passivating insulation blanket 300 may have any range of length L and width W used within common practice.

In various embodiments, the passivating insulation blanket 300 may further include a opacifier to slow radiant heat passing through the blanket. Exemplary opacifiers include carbon black, silicon carbide, and titanium dioxide. In other embodiments, the passivating insulation blanket 300 may include reinforcing fibers to add integral strength to the insulation blanket. In exemplary embodiments, the reinforcing fibers may comprise fiber glass, polyesters, rayon, or man-made or natural fibers.

As illustrated in FIG. 3, the passivating insulation blanket 300 includes an insulation core 320. The insulation core 320 is encapsulated by the enclosing fabric 310. The enclosing fabric 310 may form a capsule or pouch about the insulation core 320 to form a barrier between the insulation core 320 and the external environment (e.g., the ambient environment). The enclosing fabric 310 may comprise two blankets of fabric stitched together around the insulation core 320. For example, the insulation core 320 may be encapsulated between two high-temperature glass fiber blankets that are stitched together. In other embodiments, the enclosing fabric 310 may be a single piece of fabric that forms a pouch of pocket within which the insulation core 320 is inserted before an open end of the enclosing fabric 310 is stitched together. In some embodiments, the passivating insulation blanket 300 may not include an enclosing fabric 310. Instead, the passivating insulation blanket 300 may include the insulation core 320.

The insulation core 320 may contain a microporous material. The microporous material may be formed from compacted powder having an interconnected pore size that is equal to or below the means free path of air molecules at standard atmospheric conditions. In various embodiments, standard atmospheric conditions may be defined as a temperature of 273.15 K (0° C., 32° F.) and an absolute pressure of exactly 105 Pa (100 kPa, 1 bar). In other embodiments, standard atmospheric conditions may be defined as the present ambient conditions.

An exemplary microporous material is particulate silica aerogel. Particulate silica aerogel is a synthetic highly porous and ultralight weight material typically made through a sol-gel process. Aerogel is an excellent thermal insulator due to its light weight (i.e., typically 98% air) and extremely small pore size (typically 10-40 nm). In some embodiments, the silica aerogel may include between 1 and 10 weight percent of a black body material. The black body material may greatly minimize heat or thermal energy transfer due to radiation. In embodiments where the insulation core 320 includes aerogel, the enclosing fabric 310 may be a polyurethane foam. For example, the polyurethane foam may create a protective envelope around the aerogel insulation core 320.

The insulation core 320 may include one or more additional materials. Exemplary additional materials that may be mixed or combined with the insulation core 320 material include precipitated silica, calcium carbonate, talc, and mag hydroxide. While these additional materials may not provide additional insulating properties to the passivating insulation blanket 300, the additional materials may provide other advantageous properties, such as lower manufacturing costs, fire retardancy, and the like.

The insulation core 320 may be hydrophobic. As noted above, the hydrophobic nature of the insulation core may result in complete inhibition of moisture intrusion or may result in some negligible amount of moisture intrusion. The insulation core 320 may include hydrophobic ingredients that make the entire insulation core 320 water repellant or hydrophobic. An exemplary hydrophobic ingredient may be silicone coated fumed silica. In various embodiments, methylsiloxane or a paraffin wax may be used to provide a hydrophobic character to the insulation core 320. As noted above, particulate or dust of the hydrophobic ingredient may build up on the enclosing fabric 310. In embodiments, where the enclosing fabric 310 may not be initially hydrophobic, the build of the hydrophobic ingredient dust or particulate may impart hydrophobic properties to the enclosing fabric 310.

The passivating insulation blanket 300 also includes a passivator 330, which may be deposited in the insulation core 320. The passivator 330 may include a leachable component. Optionally, the passivator 330 may include more than one leachable component. In embodiments, the leachable component may be high solubility silicate compounds or a material capable of producing high solubility silicate ions. Different silicate-containing compounds may provide different properties to the leachable component, such as varying solubility and longevity properties. In embodiments, the passivator 330 may only include the leachable component. In such embodiments, the passivator 330 may be the leachable component. Accordingly, as discussed herein, it is understood that the passivator 330 may be the leachable component and vice versa.

Optionally, the passivator 330 may include components in addition to the leachable component. For example, the passivator 330 may include a carrier. A carrier may be a component that carries and influences the properties of the leachable component. A carrier may be a component in addition to the leachable component that improves the longevity and stabilizes the properties of the passivator 330, such as the passivator 330's solubility. In embodiments, the leachable component may be carried by the carrier. In such embodiments, the solubility of the leachable component may be controlled by the carrier. For example, in embodiments without the carrier, the entire content of the leachable component may leach during a first activation, exhausting the leachable components of the passivator 330. However, in the presence of a carrier, the quantity of the leachable components leached during a given activation period may be controlled. For example, the carrier may vary the solubility of the leachable component and impact the leachable component's affinity to dissolve in water. In other embodiments, varying the leachable component's geometry or composition may also be used to control the quantity of leachable component leached during an activation period. Exemplary carriers may include low solubility silicate compounds, or materials capable of producing low solubility silicate ions, and metal oxides.

The leachable component may be capable of leaching from the insulation core 320 to the enclosing fabric 310 and/or into a surface environment that is proximate to a surface insulated by the passivating insulation blanket 300. The surface environment may encompass the space in the immediate vicinity of the surface insulated by the passivating insulation blanket 300, including the space between the surface and the passivating insulation blanket 300. Leaching may include the movement of the leachable component from the insulation core 320 to the surface environment. Leaching of the leachable component allows the leachable component to be extracted or moved from the insulation core 320 by the action of intruding water or other liquids. For example, the leachable component of the passivator 330 may be water soluble meaning that the leachable component has an affinity for dissolving into water or other liquids present in the surface environment. The passivator 330 may be inorganic or organic depending on the need and/or application.

The leachable component may be capable of neutralizing acidic components that are present in the surface environment or present within the passivating insulation blanket 300. For example, when the leachable component comes in contact with the acidic components, the leachable component may neutralize the acidic components to minimize any negative or corrosive effects of the acidic components. The leachable component may include one or more alkaline components to enable the leachable component to neutralize the acidic components. The alkaline components may allow the passivator 330 to act as a pH buffer. The leachable component may promote magnetite formation on a surface, such as a pipe, when exposed to the surface environment. In part, the promotion of magnetite formation may be due to the pH buffering ability of the leachable component. The pH buffering ability of the passivator 330 will be discussed in further detail with respect to FIG. 6.

The leachable component may be water soluble and capable of reacting with a surface, such as a pipe, to form a protective coating on the surface to aid in inhibiting corrosion formation on the surface. The leachable component may be inorganic. As noted above, the leachable component may be a silicate-containing compound. In embodiments where the leachable component is a silicate-containing compound, the silicate-containing compound may be high solubility silicate ions, including anions, or capable of readily producing silicate anions. The silicate anions may allow the leachable component to form a protective coating about a surface, such as a pipe surface. The protective coating ability of the passivator 330 will be discussed in further detail with respect to FIG. 5.

The passivator 330 may be non-consumable. The non-consumable passivator 330 may be non-consumable in that there may be no appreciable change to a mass of the passivator 330 after an extended time of activation. The term activation may be interchangeable with the phrase "in use". The non-consumable property of the passivator 330 may provide for no significant or appreciable change to the content or mass of the passivator 330 over the lifetime of the passivating insulation blanket 300.

In embodiments, the passivator may be non-consumable such that the leachable component's content drops less than 25% over a lifetime usage of the passivating insulation blanket. For example, if the leachable component contains high solubility silicate ions then, the silicate content may not change significantly after 40 sequential soak-cycles. 40 soak-cycles may represent the corrosive exposure a typical passivating insulation blanket may experience during the lifetime of the passivating insulation blanket. Significant change to the silicate content may include a drop in the leachable component's content that is less than 25%, less than 20%, less than 15%, less than 10%, or less than 5% over a lifetime usage of the passivating insulation blanket. While the silicate content may drop, the drop may not result in any reduction to the passivating insulation blanket's corrosion inhibition performance and thus, the drop is considered to be insignificant. Accordingly, the non-consumability property of the passivator 330 may not diminish over the lifetime of the passivating insulation blanket 300.

Figure 4:
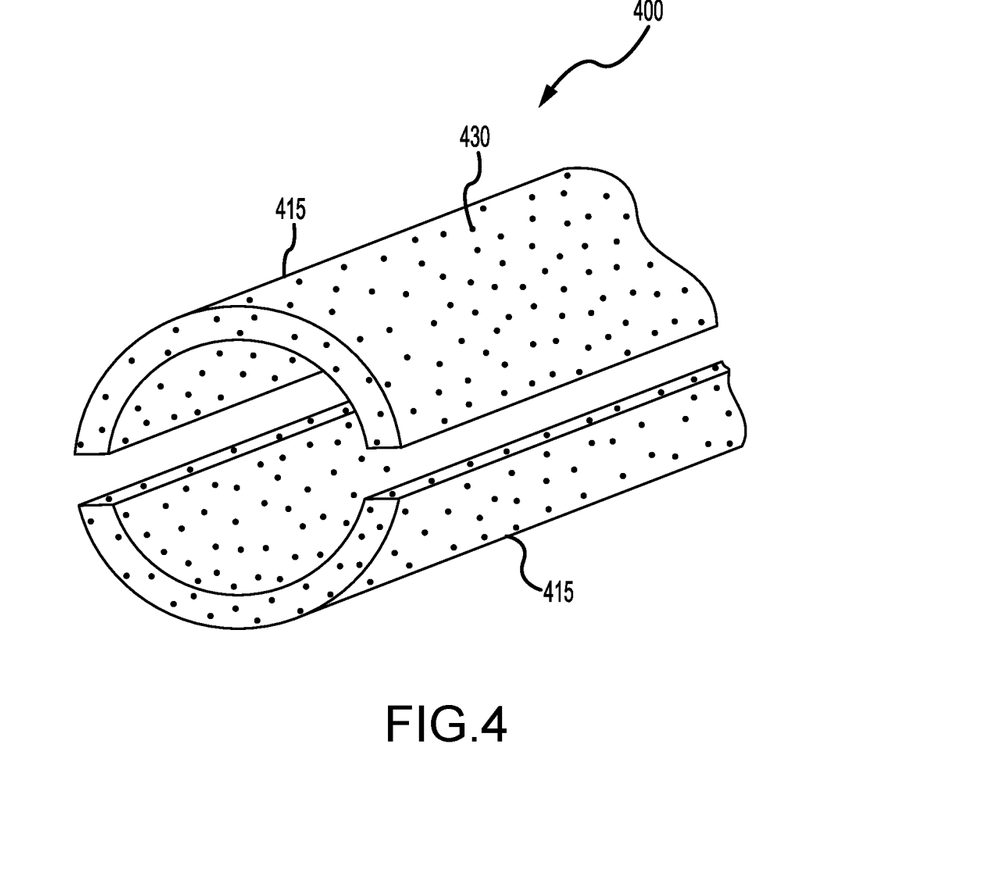
FIG. 4 is a schematic perspective view of a passivating insulation blanket according to another embodiment of the present invention having a preformed insulation segment with a deposited passivator.

As noted above, the passivating insulation blanket 300 may be formed or molded into various configurations such to be positionable about an object. As illustrated in FIG. 4, the passivating insulation blanket 400 may include an insulation segment 415. In various embodiments, the insulation segment 415 may be pre-formed or molded into a set configuration. The example illustrated in FIG. 4 shows insulation segment 415 molded into an arrangement formed to match the outer circumference of a pipe.

The passivating insulation blanket 400 illustrated in FIG. 4 also shows that the passivating insulation blanket 400 may include two insulation segments 415. In various embodiments, the passivating insulation blanket 400 may include one insulation segment 415, two insulation segments 415, three insulation segments 415, or even four insulation segments 415 configured to fit together to form about the exterior of a surface. In various embodiments, the passivating insulation blanket 400 may include more than four insulation segments 415 that are configured to be arranged in a block pattern to cover a surface, such as a pipe. The passivating insulation blanket 400 may be the same as the passivating insulation blanket 100 and have similar or the same characteristics as the passivating insulation blanket 100 discussed in reference to FIG. 1. In various embodiments, the passivating insulation blanket 400 may be the same as the passivating insulation blanket 200 and/or the passivating insulation blanket 300. Respectively, any discussion with respect to FIGS. 1, 2, and 3 is hereby incorporated.

The insulation segment 415 may include an insulation material. The insulation material may be hydrophobic for resisting moisture intrusion into the insulation segment 415. As discussed above, the hydrophobic property of the insulation material may allow the insulation material to be completely resistant to moisture intrusion or may allow the insulation material to be substantially hydrophobic wherein negligible moisture intrusion may occur. In various embodiments, the insulation segment 415 may be the same as insulation core 320. For example, the insulation segment 415 may include one or more additional materials or the insulation segment 415 may include a microporous material.

Optionally, the insulation material may include entangled fibers set in a preformed arrangement. Exemplary entangled fibers may include mineral wool. In embodiments where the insulation segment 415 is made of mineral wool, the mineral wool may include inorganic fibers derived from basalt bound with a thermosetting resin. Mineral wool insulation may provide excellent thermal insulation performance for a variety of applications. The variety of applications may range from sub-ambient conditions to high temperature applications.

The passivating insulation blanket 400 also includes a passivator 430 that is deposited within the insulation segment 415. The passivator 430 may be the same as the passivator 330. The passivator 430 may be deposited into the insulation segment 415 before the insulation segment is formed or molded into a final configuration. For example, the passivator 430 may be deposited into the mixture of the insulation material before a binder is added to the insulation material to begin setting the insulation material into a desired arrangement. In some embodiments, the passivator 430 may be captured within the insulation material via the binder that is applied to bind or adhere the mineral wool fibers together. In other embodiments, the passivator 430 may be captured within the insulation material by the entangled fiber web or mesh. In such embodiments, a binder or other adhesive is not required to capture or lock the passivator 430 within the insulation material. Rather, the passivator 430 may be relatively free floating within the insulation material.

As noted above, the passivator 430 may be the same as the passivator 330. Similar to passivator 330, the passivator 430 may include a leachable component that leaches from the insulation segment 415 to a surface environment between the insulation segment and a surface. In various embodiments, the passivator 430 may include more than one leachable component. The leachable component may be able to leach or move from inside the insulation segment 415 to the surface environment. In part, the movement of the leaching component may be due to the leachable component's water soluble composition. In embodiments, the passivator 430 may be inorganic, while in other embodiments, the passivator 430 may be organic.

Similar to the leachable component discussed with respect to the passivator 330, the passivator 430's leachable component may be capable of neutralizing acidic components present in the surface environment or present within the insulation segment 415. Optionally, the leachable component may be inorganic. Exemplary leachable components include one or more alkaline components. The leachable component may act as a pH buffer by neutralizing acidic components that the leachable component comes in contact with, minimizing any negative or corrosive effects of the acidic components. By acting as a pH buffer, the leachable component may promote magnetite formation on the surface. The pH buffering property of the passivator 430 will be discussed in further detail with respect to FIG. 6.

Again, similar to the leachable component of the passivator 330, the passivator 430's leachable component may be water soluble and capable of forming a protective coating on a surface, such as a pipe surface, to aid in inhibiting corrosion formation on the surface. In various embodiments, the leachable component may include silicate anions or material capable of forming silicate anions. The protective coating property of the passivator 430 will be discussed in further detail with respect to FIG. 5.

The passivator 430 may optionally include a silicate-containing compound and/or a carrier. In various embodiments, the carrier may be low solubility silicate compounds, or a material capable of producing low solubility silicate ions, and/or metal oxides. The same as the passivator 330, the passivator 430 may be non-consumable. The passivator 430 may be non-consumable such that the corrosion inhibiting properties, such as the pH buffer or protective coating formation, may not diminish over time. Such properties may not diminish over the lifetime of the passivating insulation blanket 400.

Figure 5:
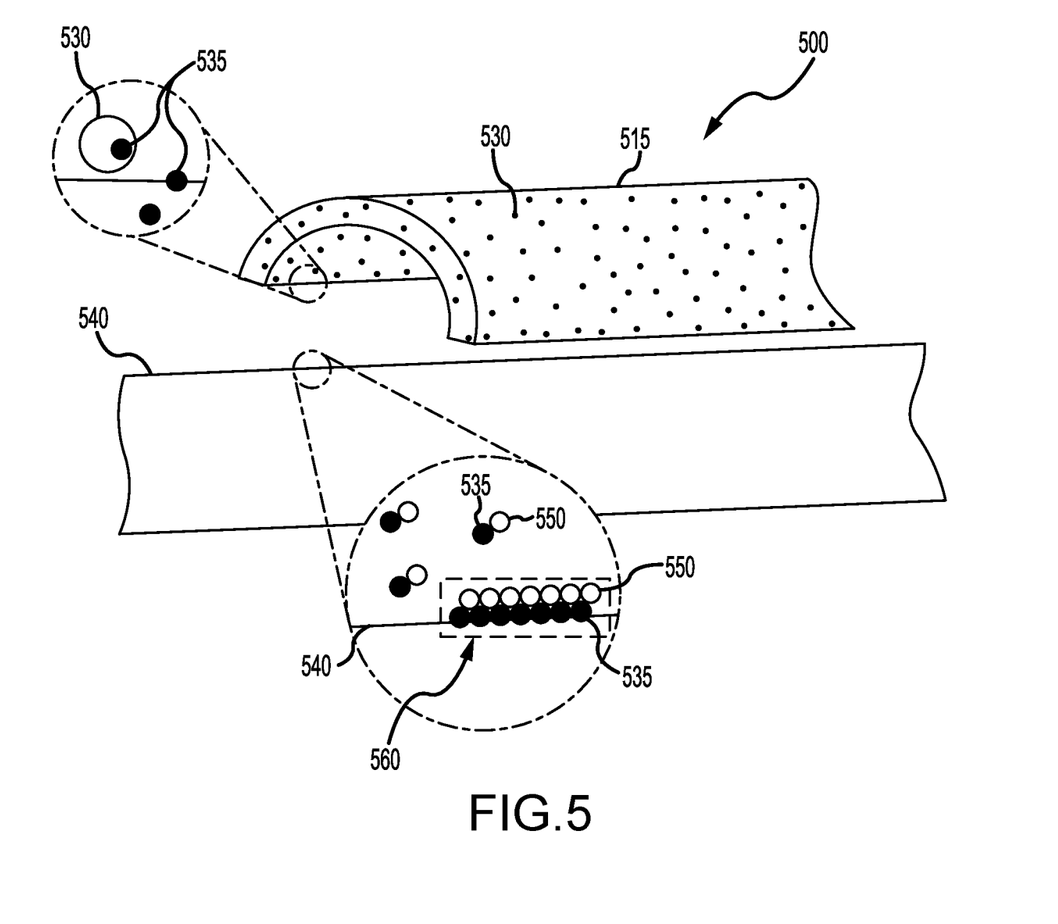
FIG. 5 is a schematic illustration of a passivating insulation blanket with a leachable component wherein the insulation blanket is separated from a surface to show the leachable component forming a protective coating on the surface.

FIG. 5 provides a schematic illustration of the leachable component from the passivating insulation blanket 500 leaching from the insulation segment 515 to form a protective coating on the surface 540. For purposes of describing the leachable component, the passivating insulation blanket 500 is shown as separated from the surface 540 of the insulated object. In typical use, the passivating insulation blanket 500 would be in contact with the surface 540 of the object. The surface 540 may be a pipe surface, a surface of a storage tank, column, level gauge, or another type of equipment.

For ease in describing the protective coating formation property of the passivator 530, a simplified reaction or process is described and illustrated in FIG. 5. A person of skill will recognize that the formation of the protective coating may involve other processes that are not described or illustrated.

As illustrated in FIG. 5, the passivating insulation blanket 500 includes the insulation segment 515, which may be the same as any of the insulation segments described herein. The insulation segment 515 includes a passivator 530 deposited within the insulation segment 515. The passivator 530 includes a leachable component 535, which is the same as the leachable components discussed with respect to FIG. 3, FIG. 4, and FIG. 6.

When activated the leachable component 535 leaches from the insulation segment 515 into the surface environment. Activation, as used herein, means one or more environmental factors that induce the movement or leaching of the leachable component 535 into the surface environment. In a specific example, intruding water 550 induces the leachable component 535 to leach from the insulation segment 515, in part because the leachable component 535 is water soluble and has an affinity for being dissolved in the intruding water 550. As illustrated in FIG. 5, the intruding water 550 penetrates under the passivating insulation blanket 500 and into contact with the leachable component 535. The intruding water 550 may be undesirable because the intruding water 550 may contain acidic components that may promote corrosion formation and degrade the integrity of the surface 540.

The activation of the passivator 530 may not occur until the hydrophobic property of the insulation segment 515 is compromised. For example, if the insulation segment 515 includes insulation material that is hydrophobic, then water is typically not able to penetrate the passivating insulation blanket 500 to reach the surface 540. If water is unable to penetrate the passivating insulation blanket 500, then the leachable component 535 is typically not induced to leach from the insulation segment 515. Situations that may compromise the hydrophobic property of the insulation material may include fire or high temperature exposure that dissipates or renders the insulation material's hydrophobic property less effective or ineffective. In such embodiments, the insulation material may be burnt off, resulting in the insulation segment 515 no longer having full hydrophobic or moisture repellant properties.

Once the leachable component 535 is activated, the leachable component 535 leaches from the insulation segment 515, typically towards the surface 540 of the insulated object. The affinity of the leachable component 535 for the intruding water 550 causes the leachable component 535 to leach or migrate through the insulation segment 515 with the water 550.

The leachable component 535 may include one or more silicate anions or components capable of producing silicate anions. For example, the leachable component 535 may be high solubility silicate ions or a silicate-containing compound capable of producing high solubility silicate ions. Exemplary silicate anions or components capable of producing silicate anions include silicon dioxide, also known as silica, silicic acid or silicic acid anhydride (e.g., $SiO_2$), orthosilicate (e.g., $SiO_4^{4-}$), metasilicate (e.g., $SiO_3^{2-}$) and pyrosilicate ($Si_2O_7^{6-}$).

The surface 540 of the insulated object may be a metal surface that is formed in part of iron compounds that are prone to corrosion. When the water 550 intrudes or is absorbed by the passivating insulation blanket 500, the silicate anions of the leachable component 535 may dissolve into the intruding water 550. When the leachable component 535 leaches from the insulation segment 515 and is dissolved by the intruding water 550, the silicate anions of the leachable component 535 may settle on the surface 540 of the insulated object along with the intruding water 550.

The silicate anions of the leachable component 535 may form a protective coating 560 on the surface 540 of the insulated object. In exemplary embodiments, the protective coating 560 may be an iron silicate ($FeSiO_3$) coating and/or a silica gel ($SiO_2$) coating. The formation of the protective coating 560 occurs in part because the silicate anions of the leachable component 535 react with the iron compounds on the surface 540 of the insulated object. The formation of inorganic iron silicate and/or silica gel helps to stabilize and toughen the protective coating 560. The formation of the protective coating 560 inhibits formation of undesirable corrosion, such as hematite, because the surface 540 is covered by the protective coating 560. The protective coating 560 may prevent further exposure of the surface 540 to the environmental factors, specifically intruding water 550, which may prevent further corrosion. Additionally, the protective coating 560 may further strengthen the surface 540 of the insulated object.

Figure 6:
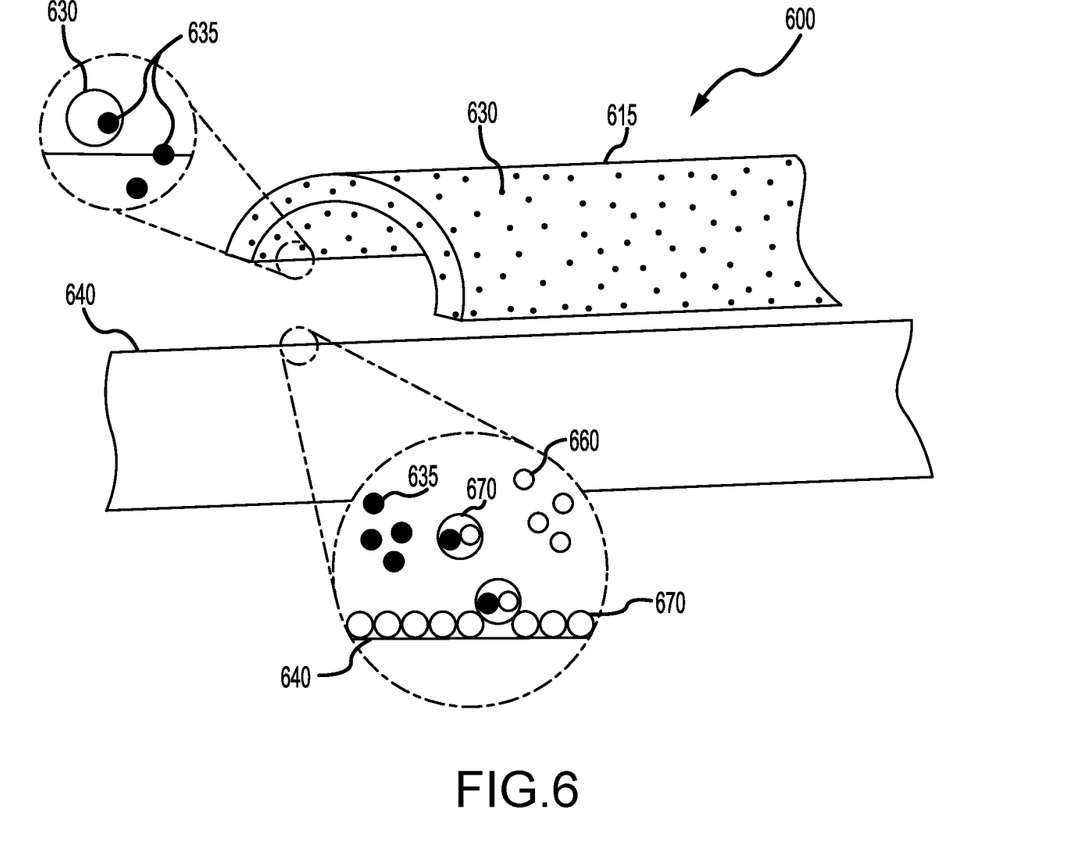
FIG. 6 is a schematic illustration of a passivating insulation blanket with a leachable component wherein the insulation blanket is separated from a surface to show the leachable component acting as a pH buffer when exposed to a surface environment exterior to the passivating insulation blanket.

FIG. 6 provides a schematic illustration of a leachable component 635 leaching from a passivating insulation blanket 600 to act as a pH buffer when exposed to an environmental factor. In the illustrated embodiment, the surface 640 of the insulated object is a pipe surface, although the surface 640 may correspond to any other insulated object, such as a pressure vessel, compressor, control panel, or another type of equipment. For ease in describing the functions of the leachable component 635, the passivating insulation blanket 600 is illustrated as separated from the surface 640 of the insulated object. Generally, the passivating insulation blanket 600 is in contact with the surface 640 of the insulated object.

For ease in describing the pH buffering property of the passivator 630, a simplified reaction or process is described and illustrated in FIG. 6. A person of skill will recognize that the pH buffering property of the passivator may involve other processes that are not described or illustrated.

The passivating insulation blanket 600 includes an insulation segment 615 having a passivator 630 deposited within the insulation segment 615. The passivator 630 includes a leachable component 635, which is the same as the leachable components discussed previously with respect to FIG. 3, FIG. 4, and FIG. 5. The leachable component 635, and in particular the pH buffering property of the leachable component 635, may undergo the same or similar functions during activation as those discussed with respect to FIG. 3, FIG. 4, and FIG. 5.

When activated the leachable component 635 leaches from the insulation segment 615 into the surface environment. As previously described, the activation of the passivator 630 may not occur until the hydrophobic property of the insulation segment 615 is compromised.

Once the leachable component 635 is activated, the leachable component 635 may leach from the insulation segment 615 towards the surface 640 of the insulated object. An intruding water 660 carrying acidic components may be present at the surface 640. The intruding water 660 may have penetrated the passivating insulation blanket 600 and may be present at the surface environment proximate to the surface 640. Any acidic components present in the intruding water 660 may cause the surface proximate to the surface 640 to have a low pH value. pH value is measured on a logarithmic scale and is used to specify the acidity or basicity of an aqueous solution. For example, water generally has a neutral pH of around 7, meaning that water is neither acidic nor basic.

The leachable component 635 comprising alkaline components may have an affinity for the acidic components present in the intruding water 660, due to the leachable component 635's alkalinity. Thus, the leachable component 635's affinity for the acidic components in the intruding water 660 and the leachable component 635's solubility may provide the activation mechanism for inducing the leachable component 635 to leach towards the intruding water 660.

As noted above, the leachable component 635 may include one or more alkaline components. The alkaline components may have alkali properties, such as having a pH greater than 7. A pH greater than 7 may be considered basic. The leachable component 635 may be high solubility silicate ions, such as alkaline cations that are reactable with the acidic components to neutralize them. Exemplary leachable component 635 include calcium silicate ($Ca_2SiO_3$), sodium silicate ($Na_{2x}SiO_{2+x}$), magnesium silicate ($MgSiO_3$), aluminum silicate ($AlSiO_3$), potassium silicate ($K_2SiO_3$), or combinations thereof. The one or more alkaline components may disassociate to form alkaline cations. Exemplary alkaline cations that may form from the alkaline components include a calcium cation (e.g., $Ca^{2+}$), a sodium cation (e.g., $Na^{2X+}$), a magnesium cation (e.g., $Mg^+$), an aluminum cation (e.g., $Al^+$), and a potassium cation (e.g., $K^{2+}$). The alkaline cations may have an affinity for acidic components. In various embodiments, the alkaline cations may be the disassociated cations corresponding to the silicate anions discussed with respect to FIG. 5. In various embodiments, the acidic components may include weak acids, such as sulfuric acid, ($H_2SO_4$), hydrogen sulfate ($HSO_4^-$), hydrochloric acid (HCl), carbonic acid (e.g., hydrogen carbonate $HCO_3^-$).

Acidic conditions, such as those have a pH below 7, may promote corrosion formation. To inhibit corrosion formation, the leachable component 635 comprising alkaline components may neutralize the acidic components in the intruding water 660 before the acidic components promote corrosion on the surface 640 or damage the insulation segment 615. The alkaline components of the leachable component 635 may neutralize the acidic components in the intruding water 660. When the leachable component 635 contacts the acidic components in the intruding water 660, a neutral resultant 670 may form.

By neutralizing the acidic components carried in the intruding water 660, the leachable component 635 acts as a pH buffer. A pH buffer is a component that maintains the pH of an environment within a particular range. For example, the leachable component 635 may buffer the pH of the surface environment to be neutral, around 7 pH. In this way, the passivating insulation blanket 600 may maintain a pH above 7 for the environment surrounding the surface 640. In various embodiments, the passivating insulation blanket 600 may maintain a pH between 9-10. In other embodiments, the passivating insulation blanket may maintain a pH between 9-11.

Table 1 provides data showing the correlation between the leachable component content and corrosion propensity. Two different corrosion propensity indicators are highlighted on Table 1. The first corrosion propensity indicator is the pH maintained by the passivating insulation blanket. The second corrosion propensity indicator is the sodium-and-silicate-to-chloride-and-fluoride ratio. Under ASTM C795, the sodium-and-silicate-to-chloride-and-fluoride ratio may indicate a material's propensity for corrosion. The lower the sodium-and-silicate-to-chloride-and-fluoride ratio, the higher the material's propensity for corrosion is predicted to be. Conversely, the higher the sodium-and-silicate-to-chloride-and-fluoride ratio, the lower the material's propensity for corrosion is predicted to be.

Starting with the control passivating insulation blanket in the first row of Table 1, the control having no passivator maintains a pH of approximately 8.6 within the surface environment. Compared to the passivating insulation blankets including the passivator, that maintain a pH above 9, the control has a higher propensity for corrosion. Additionally, the control passivating insulation blanket leaches approximately 1736 ppm of silicate into the surface environment and approximately 7 ppm of sodium. While the chloride content is non-detectable for the control passivating insulation blanket, the fluoride content is 15 ppm. The sodium-and-silicate-to-chloride-and-fluoride ratio for the control is approximately 116.5-to-1.

In contrast to the control, the passivating insulation blankets containing the passivator exhibit lower corrosion propensity. As noted on Table 1, the passivators used comprise a silicate-containing compound including high solubility silicate ions, and/or a carrier comprising low solubility silicate ions and metal oxides at varying weight percentages. The passivator content with the lowest corrosion propensity is the 10% by weight silicate-containing compound and 10% by weight carrier passivator. This 10/10 silicate-containing compound to carrier composition maintains a 10.9 pH and has a 1592-to-1 sodium-and-silicate-to-chloride-and-fluoride ratio, both corresponding to a lower corrosion propensity than the control.

Another exemplary passivator composition may include 5% by weight silicate-containing compound and 5% by weight carrier. As shown on Table 1, this 5/5 silicate-containing compound to carrier composition maintains a 10.5 pH and has a 671-to-1 s sodium-and-silicate-to-chloride-and-fluoride ratio. The higher pH and the higher ratio indicate that the 5/5 silicate-containing compound to carrier composition corresponds to a reduction in corrosion propensity for the passivating insulation blanket over the control. Accordingly, Table 1 illustrates that the addition of a passivator, such as those discussed herein, may reduce the corrosion propensity of a passivating insulation blanket.

TABLE 1

| | Silicate (wt %) | Carrier (wt %) | pH | Silicate (ppm) | Sodium (ppm) | Chloride (ppm) | Fluoride (ppm) |
|---|---|---|---|---|---|---|---|
| Passivating insulation blanket—Control | — | — | 8.6 | 1736 | 7 | non-detect | 15 |
| Passivating insulation blanket with Silicate-containing Compound | 10 | — | 10.7 | 52579 | 8577 | 19 | 8 |
| Passivating insulation blanket with Carrier | — | 10 | 9.4 | 1624 | 33 | 16 | 35 |

TABLE 1-continued

| | Silicate (wt %) | Carrier (wt %) | pH | Silicate (ppm) | Sodium (ppm) | Chloride (ppm) | Fluoride (ppm) |
|---|---|---|---|---|---|---|---|
| Passivating insulation blanket with both Silicate-containing compound and Carrier | 5 | 5 | 10.5 | 25524 | 3349 | 19 | 24 |
| Passivating insulation blanket with both Silicate-containing compound and Carrier | 10 | 10 | 10.9 | 57260 | 11186 | non-detect | 43 |

The pH that the passivating insulation blanket 600 maintains may depend on the application in which the passivating insulation blanket 600 is used. For example, for certain applications it may be desirable to promote magnetite formation on the surface 640. Magnetite formation may be desirable because magnetite formation on the surface 640 may impede or reduce propagation of further corrosion. In particular, magnetite formation may impede hematite formation. Hematite formation, commonly known as rust, may be undesirable in many applications because of the hematite's depredatory and degradation effects on equipment, in particular metal surfaces. For example, hematite formation may result in deeper and more harmful pitting on a metal surface. Therefore, to prevent the formation of a more undesirable form of corrosion, such as hematite, a less undesirable form of corrosion, such as magnetite, may be promoted.

Magnetite formation may be promoted by a reducing environment (i.e., an oxygen deficient environment). Such reducing environments may be environments having higher pHs, such as pHs above 8.5, and higher temperatures, such as temperatures above 200° F. For example, in a high temperature application having a temperature of 250° F. where magnetite formation is desirable, the leachable component 635 may buffer the environment to be between 9-11 pH.

Figure 7:
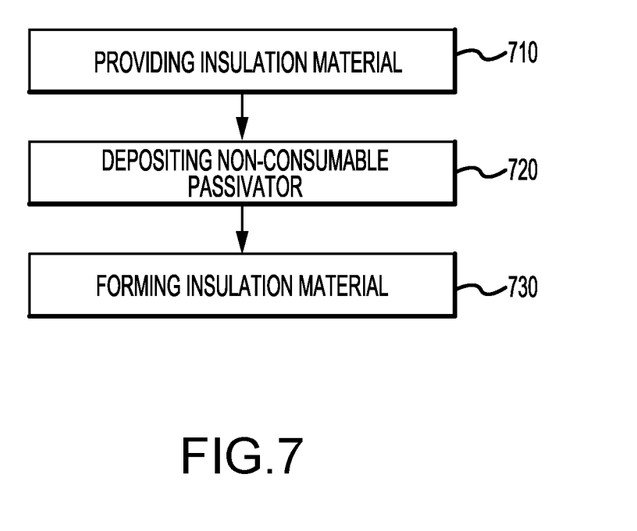
FIG. 7 illustrates a method for manufacturing a passivating insulation blanket.

Turning now to FIG. 7. FIG. 7 provides a flow diagram of a method 700 for manufacturing a passivating insulation blanket. The method 700 for manufacturing a passivating insulation blanket may include providing insulation material 710. The insulation material provided in step 710 may be substantially hydrophobic. In various embodiments the insulation material may be the same material as the insulation core 320. In other embodiments, the insulation matter may be the same material as the insulation segment 415 or the insulation segment 515. Exemplary insulation materials that may be provided at step 710 include a microporous material, a particulate silica aerogel, a foam, an entangled fiber set, or mineral wool.

Providing insulation material 710 may include providing the insulation material in solid form into a mixing vessel. In other embodiments, the insulation material provided at step 710 may be in an aqueous state or in an aerosolized state. That is, the insulation material may be in a colloidal air suspension or dissolved in a carrier liquid. Within the mixing vessel, additional materials may be added to the insulation material. For example, a opacifier, a fire retardant, reinforcing fibers, or a moisture repellant may be added to the insulation material.

After the insulation material is provided at step 710, a non-consumable passivator may be deposited at step 720. Depositing the non-consumable passivator at step 720 may include providing the non-consumable passivator into the insulation material. The deposited non-consumable passivator may be the same as the passivator 330, the passivator 430, the passivator 530, or the passivator 630. The non-consumable passivator may be non-consumable such that there may be no appreciable change to a mass of the non-consumable passivator after an extended time of activation. In embodiments, the non-consumable passivator may contain a leachable component, such as the leachable component 535 or the leachable component 635, that is capable of leaching from the insulation material when activated. The leachable component may include inorganic material capable of neutralizing acidic components when the leachable component and the acidic components come in contact with each other. In embodiments, the leachable component may be water soluble and capable of reacting with a surface to form a protective coating on the surface that aids in inhibiting corrosion formation on the surface.

Step 720 may occur while the insulation material is in the mixing vessel. In various embodiments, the non-consumable passivator may be in a solid or powder form. While in other embodiments, the non-consumable passivator may be in a suspended state, either in an aqueous solution or aerosolized. In various embodiments, the amount of the non-consumable passivator deposited into the insulation material may range from 5 to 10 percent by weight. In various embodiments the amount of non-consumable passivator deposited may range between 1 and 5 weight percent, 5 and 10 weight percent, 10 and 15 weight percent, 15 and 20 weight percent, 20 and 25 weight percent, 25 and 30 weight percent, 35 and 40 weight percent, 40 and 45 weight percent, 45 and 50 weight percent, or any various of these ranges.

At step 730, the insulation material is formed into the passivating insulation blanket. Depositing the non-consumable passivator 720 may occur before the insulation material is formed into an insulation segment, such as the insulation segment 415, the insulation segment 515, or the insulation segment 615, at step 730. In embodiments where the passivating insulation blanket is preformed or molded into a desired configuration, the non-consumable passivator may be deposited prior to setting the insulation segment (e.g., the molding or drying to solidify the insulation material). In other embodiments, the non-consumable passivator may be deposited during the setting process itself. In embodiments where the passivating insulation blanket is flexible, the non-consumable passivator may be deposited prior to the formation of an insulation core, such as the insulation core 320. In other embodiments, the non-consumable passivator may be deposited prior to the encapsulating of the insulation core by an enclosing fabric, such as the enclosing fabric 210 or 310.

Optionally, the forming of the insulation material 730 may include drying and/or cooling the insulation material. In various embodiments, the forming of the insulation material 730 may include spraying or aerosolizing the insulation material to form the passivating insulation material.

Aspects of the invention have now been described in detail for the purposes of clarity and understanding. However, it will be appreciated that certain changes and modifications may be practiced within the scope of the appended claims.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A passivating insulation segment positionable about an insulated structure, wherein the passivating insulation segment comprises:
    an insulation material that is substantially hydrophobic; and
    a non-consumable passivator that is added to the insulation material, wherein:
        the non-consumable passivator is non-consumable such that there is no appreciable change to a mass of the non-consumable passivator after an extended time of activation;
        the non-consumable passivator comprises a leachable component that leaches from the insulation material to a surface environment exterior to the insulation material;
        the leachable component is inorganic and capable of neutralizing acidic components when the leachable component and acidic components come in contact with each other; and
        the leachable component is water soluble and capable of reacting with a surface of the insulated structure to form a protective coating on the insulated structure that aids in inhibiting corrosion formation on the surface of the insulated structure.

2. The passivating insulation segment of claim 1, wherein the leachable component comprises one or more alkaline components.

3. The passivating insulation segment of claim 1, wherein the leachable component compromises high solubility silicate ions.

4. The passivating insulation segment of claim 1, wherein the leachable component acts as a pH buffer when exposed to the surface environment exterior to the insulation material.

5. The passivating insulation segment of claim 1, wherein the non-consumable passivator comprises at least one high solubility silicate and a carrier, wherein the carrier comprises low solubility silicate ions and metal oxides.

6. The passivating insulation segment of claim 1, wherein the leachable component promotes magnetite formation on the surface of the insulated structure when exposed to the surface environment exterior to the insulation material.

7. The passivating insulation segment of claim 1, wherein the insulation material comprises entangled fibers.

8. The passivating insulation segment of claim 7, wherein the entangled fibers comprise at least one of: glass fibers or mineral wool fibers.

9. The passivating insulation segment of claim 1, wherein the passivating insulation segment is rigid.

10. The passivating insulation segment of claim 1, wherein the passivating insulation segment is flexible.

11. The passivating insulation segment of claim 1, wherein the passivating insulation segment further comprises an opacifier to slow radiant heat passing through the passivating insulation segment.

12. A method of manufacturing an insulation segment positionable about an insulated structure, wherein the method comprises:
providing an insulation material, wherein the insulation material is substantially hydrophobic; and
adding a non-consumable passivator to the insulation material, wherein:
the non-consumable passivator is non-consumable such that there is no appreciable change to a mass of the non-consumable passivator after an extended time of activation; wherein:
the non-consumable passivator comprises a leachable component that is capable of leaching from the insulation material when activated;
the leachable component comprises an inorganic material capable of neutralizing acidic components when the leachable component and acidic components come in contact with each other; and
the leachable component is water soluble and capable of reacting with a surface of the insulated structure to form a protective coating on the insulated structure that aids in inhibiting corrosion formation on the surface of the insulated structure;
forming the insulation material into a preformed shape; and
setting the insulation material in the preformed shape to form the insulation segment.

13. The method of manufacturing the insulation segment of claim 12, wherein setting the insulation material in the preformed shape to form the insulation segment comprises drying the insulation material in the preformed shape to solidify the insulation material to form a rigid insulation segment.

14. The method of manufacturing the insulation segment of claim 12, wherein the non-consumable passivator added to the insulation material is 10 percent by weight.

15. The method of manufacturing the insulation segment of claim 12, wherein the leachable component comprises one or more alkaline components.

16. The method of manufacturing the insulation segment of claim 12, wherein the non-consumable passivator comprises high solubility silicate ions and a carrier.

17. The method of manufacturing the insulation segment of claim 12, wherein adding the non-consumable passivator to the insulation material comprises mixing the non-consumable passivator in a solid or powder form with the insulation material in a mixing vessel.

18. The method of manufacturing the insulation segment of claim 12, wherein adding the non-consumable passivator to the insulation material comprises forming an aqueous solution with the non-consumable passivator.

19. The method of manufacturing the insulation segment of claim 12, wherein adding the non-consumable passivator to the insulation material comprises aerosolizing the non-consumable passivator.

20. The method of manufacturing the insulation segment of claim 12, wherein forming the insulation material into the preformed shape comprises spraying or aerosolizing the insulation material to form the insulation segment.

* * * * *